United States Patent [19]
Goldstein et al.

[11] Patent Number: 4,936,102
[45] Date of Patent: Jun. 26, 1990

[54] METHOD AND APPARATUS FOR COOLING FISH ON BOARD A SHIP

[75] Inventors: Vladimir Goldstein, Toronto; David La, Downsview, both of Canada

[73] Assignee: Sunwell Engineering Company Ltd., Woodbridge, Canada

[21] Appl. No.: 220,674

[22] Filed: Jul. 18, 1988

Related U.S. Application Data

[63] Continuation-in-part of Ser. No. 203,533, Jun. 2, 1988, which is a continuation of Ser. No. 75,465, Jun. 20, 1987, abandoned.

[51] Int. Cl.$^5$ ............................................... F25C 1/00
[52] U.S. Cl. ............................................ 62/66; 62/76; 62/240; 62/330
[58] Field of Search ............... 62/240, 330, 348, 66, 62/76

[56] References Cited

U.S. PATENT DOCUMENTS

| | | | |
|---|---|---|---|
| 1,547,258 | 7/1925 | Newton | 62/435 |
| 3,721,104 | 3/1973 | Adler | 62/240 |
| 3,822,566 | 7/1974 | Lowi, Jr. | 62/435 |
| 4,051,690 | 10/1977 | Doust | 62/64 |
| 4,104,889 | 8/1978 | Hoenisch | 62/137 |
| 4,129,015 | 12/1978 | Morris, Jr. | 62/344 |
| 4,249,388 | 2/1981 | Burns | 62/185 |
| 4,338,794 | 7/1982 | Haasis, Jr. | 62/348 |
| 4,341,085 | 7/1982 | Nail | 62/124 |
| 4,509,344 | 4/1985 | Ludwigsen et al. | 62/76 |
| 4,551,159 | 11/1985 | Goldstein | 62/541 |
| 4,584,843 | 4/1986 | Pronger, Jr. et al. | 62/123 |

FOREIGN PATENT DOCUMENTS

| | | |
|---|---|---|
| 107755 | 5/1984 | European Pat. Off. . |
| 168537 | 1/1986 | European Pat. Off. . |
| 668100 | 11/1938 | Fed. Rep. of Germany . |
| 754096 | 10/1933 | France . |
| 1033872 | 6/1966 | United Kingdom . |
| 1481537 | 8/1977 | United Kingdom . |

*Primary Examiner*—William E. Tapolcai
*Attorney, Agent, or Firm*—Spencer & Frank

[57] ABSTRACT

An apparatus for cooling fish on board a ship is provided. This apparatus includes an ice-making machine for producing fine particles of ice in a brine solution. Coupled to this ice-making machine are means for directing ice from the machine to either a vessel containing brine solution or to a catch of fish. A method of cooling fish comprising producing a slurry of fine particles in brine solution in an ice-making zone and directing the fine ice particles onto either a catch of fish or into a vessel containing brine solution is also provided.

13 Claims, 4 Drawing Sheets

METHOD AND APPARATUS FOR COOLING FISH ON BOARD A SHIP

CROSS-REFERENCE TO RELATED APPLICATIONS

This application is a continuation-in-part of our pending application Ser. No. 07/203,533 filed June 2nd, 1988, which in turn is a continuation of application Ser. No. 07/075,465 filed June 20th, 1987, and now abandoned.

The present invention relates to an apparatus and a method for cooling fish on board a ship.

BACKGROUND OF THE INVENTION

It is desirable in fishing operations on board ships to cool fish soon after they are caught to ensure that they do not spoil. Conventionally, this is done by manually spreading large pieces of ice over the fish on board the ship. The disadvantages of doing this are that the fish are not cooled quickly, because the contact area between the ice and fish is small. Furthermore, the ice tends to freeze the fish because of the large amount of salt that is generally trapped in large pieces of ice. This freezing of the fish may result in spoilage of the fish due to later thawing and refreezing of the fish.

SUMMARY OF THE INVENTION

It is therefore an object of the present invention to obviate or mitigate the above-mentioned disadvantages.

According to the present invention there is provided an apparatus for cooling fish on board a ship comprising:

an ice-making machine for processing fine ice particles in a brine solution; and transport means connected to an outlet of said ice-making machine for directing ice produced by said machine to either a vessel containing sea water or to a catch of fish.

According to another embodiment of the present invention there is provided a cooling system comprising in combination a ship and an apparatus for cooling fish, said apparatus comprising:

an ice-making machine disposed on said ship for processing fine ice particles in a brine solution to form an ice-brine slurry, said ice-making machine having an outlet for dispensing said ice-brine slurry;

a vessel disposed on said ship for containing seawater, said vessel having an inlet for receiving said ice-brine slurry; and transport means disposed on said ship and being connected to the outlet of said ice-making machine, said transport means being operable to direct said ice-brine slurry along one of at least two paths within said ship to either said vessel containing seawater or to a catch of fish.

In another of its aspects, the invention provides a method of cooling fish comprising producing a slurry of fine particles in brine solution in an ice-making zone and directing the fine ice particles onto either a catch of fish or into a vessel containing brine solution.

The invention allows fish to be cooled in situ on board a ship, either by spraying ice directly thereon or by immerging the fish in a vessel containing salt water with ice on the surface thereof. Different types of fish require one or the other of these different methods of cooling. Also, the use of fine ice particles provides for better cooling of the fish because the particles have a larger surface area and the brine draining quickly therefrom. The brine quickly cools the fish while it drains and the fine ice particles completely cool the fish without freezing it.

Moreover, the use of a vessel containing salt water and ice provides a thermal storage unit which can increase the capacity of the ice-making machine. Pre-chilled seawater optionally containing ice particles can be obtained from this vessel to provide pre-chilled water for the ice-making machine and/or to provide chilled water for the condenser of the ice-making machine.

BRIEF DESCRIPTION OF THE DRAWINGS

Preferred embodiments of the invention will be further described, by way of illustration only, with reference to the following figures in which.

DETAILED DESCRIPTION OF THE PREFERRED EMBODIMENTS

Figure 1:
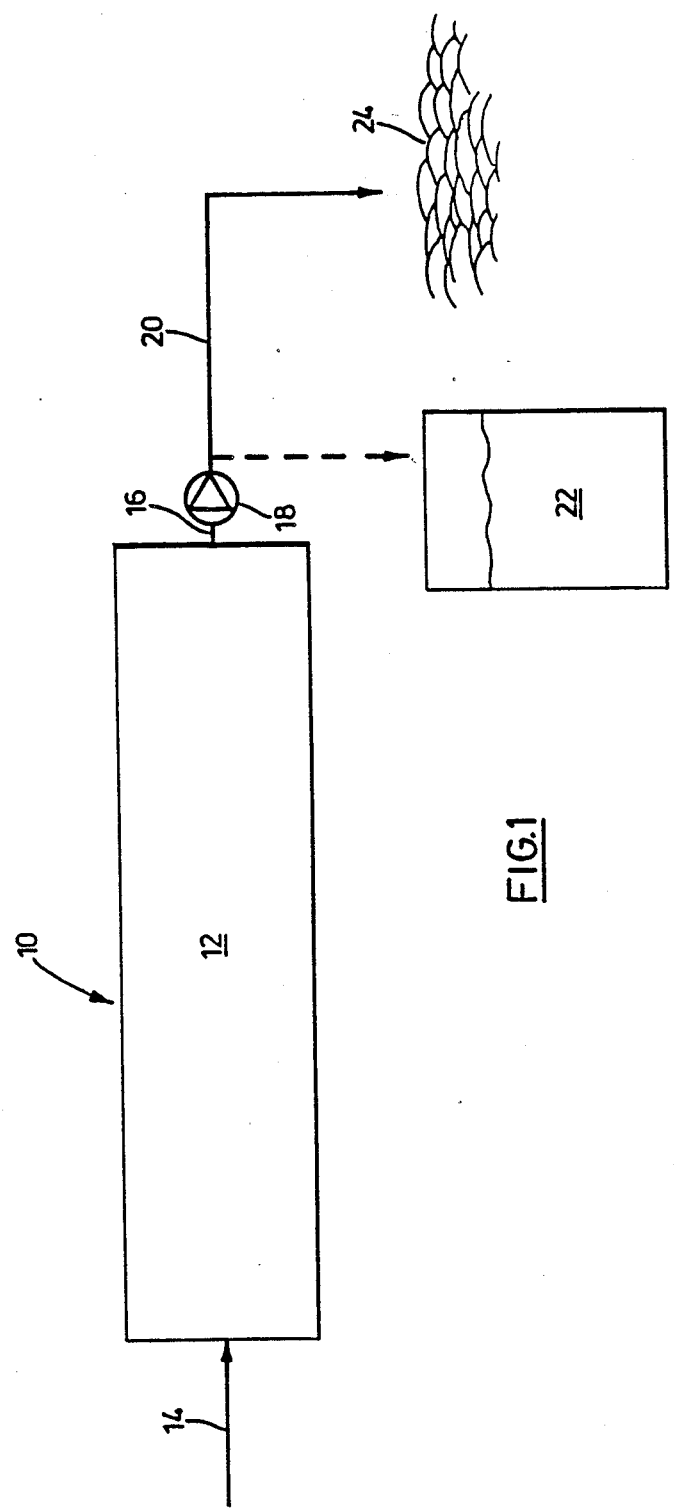
FIG. 1 is a diagrammatic illustration of an apparatus for cooling fish on board a ship.

Referring first to FIG. 1, it can be seen that an apparatus 10 for cooling fish on board a ship comprises an ice-making machine 12 capable of producing a slurry of fine particles of ice in a brine solution. The ice-making machine is of one of the designs disclosed in either U.S. Pat. No. 4,511,159 issued November 5, 1985 (Goldstein) or U.S. Pat. application No. 739,225 filed May 30, 1985 (Goldstein), the contents of both of which are incorporated herein by reference.

Brine enters the machine 12 through an inlet 14, and a slurry of fine ice particles in a brine solution exits the machine through an outlet 16. The ice-making machine preferably produces a slurry of 30–60% ice. The outlet is connected to a pump 18 which is connected to a flexible hose 20. This hose 20 can be carried to either a vessel 22 containing salt water or to a catch of fish 24 to direct ice slurry produced by the machine 12 directly to the catch of fish 24 or (as indicated by the dotted line) to the vessel 22.

Figure 2:
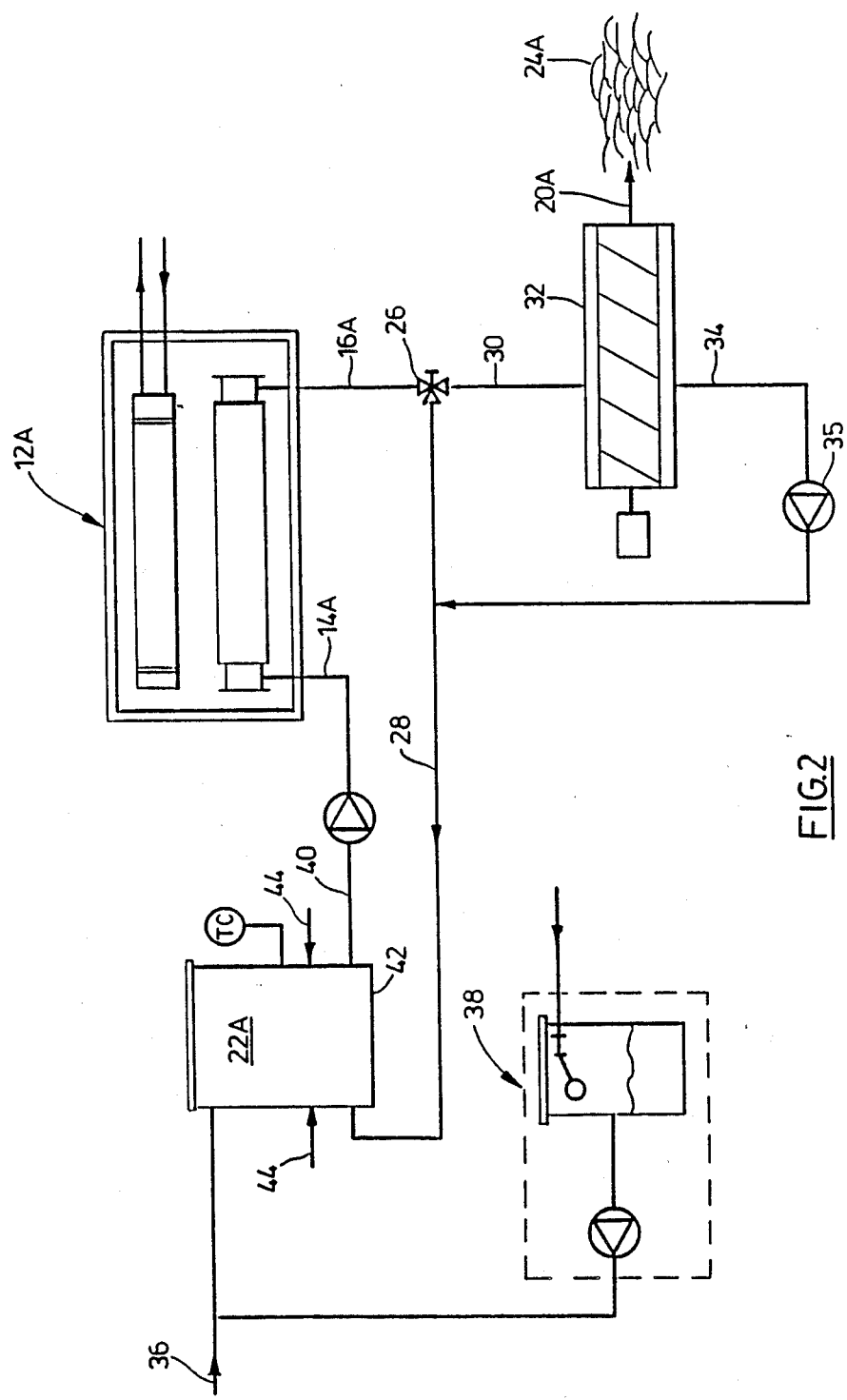
FIG. 2 is a diagrammatic illustration of an alternative embodiment of an apparatus for cooling fish on board a ship.

FIG. 2 shows an alternative embodiment of the apparatus for cooling fish. Components similar to those in FIG. 1 will be given the same reference numeral, followed by the suffix "A". In this embodiment, the outlet 16A of the ice-making machine 12A is connected by a three-way valve 26 to either the vessel 22A or to the catch of fish 24A.

A line 28 leads from the three-way valve 26 to the vessel 22A to transfer ice to the vessel 22A. A second line 30 leads from the valve 26 to a separator 32 in which ice is at least partially separated from brine and is directed through the flexible hose 20A to the catch of fish 24A. The separator 32 comprises a screw conveyor with a screen disposed therebelow. The brine from the separator 32 is sent by a line 34 to line 28 via a pump 35 and is thereby sent to the vessel 22A.

Makeup brine is sent to the vessel 22A via a direct seawater line 36 or from a brine storage unit 38. An outlet 40 in the lower portion 42 of the vessel 22A is connected to the ice-making machine 12A to transfer pre-chilled brine to the ice-making machine. Agitators, such as water jets 44, are optionally provided in the vessel 22A to agitate the ice so that some ice is entrained in the pre-chilled brine sent to the ice-making machine 12A.

In this embodiment, the efficiency of the ice-making unit is increased, resulting in substantial cost savings and reduced space requirements for the machine, by using pre-chilled brine in the ice-making machine.

Figure 3:
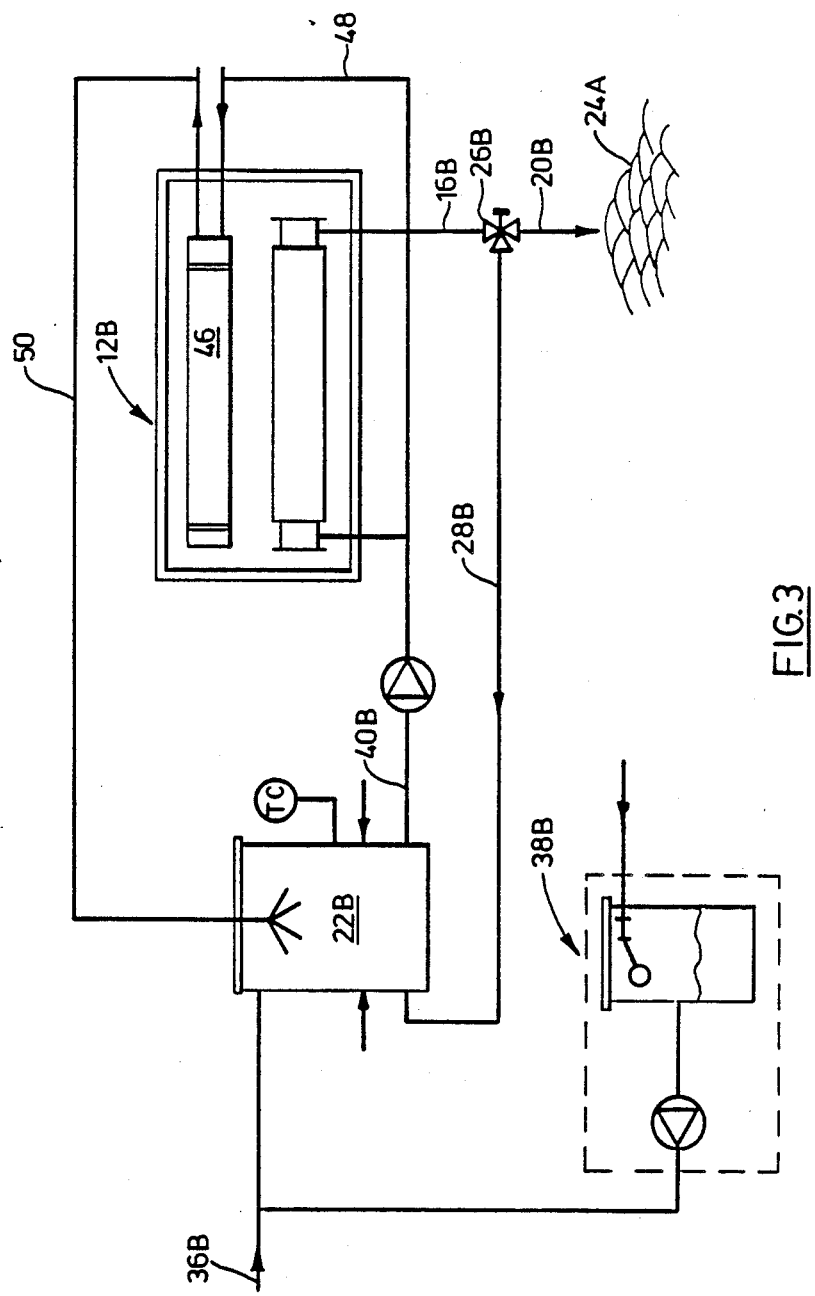
FIG. 3 is a diagrammatic illustration of another alternative embodiment of an apparatus for cooling fish on board a ship.

FIG. 3 is an alternative embodiment of the apparatus of FIGS. 1 and 2. Elements similar to those shown in FIGS. 1 and 2 will be referred to by the same reference numeral followed by the suffix "B".

In the embodiment of FIG. 3, some of the pre-chilled brine is sent to a condenser 46 of the ice-making machine 12B by a line 48. The warmed brine from the condenser 46 is then returned to the top of the vessel 22B for cooling via line 50.

In this embodiment, the use of the pre-chilled brine as a heat exchange medium for the condenser of the ice-making machine results in further increased capacity of the ice-making machine.

Figure 4A:
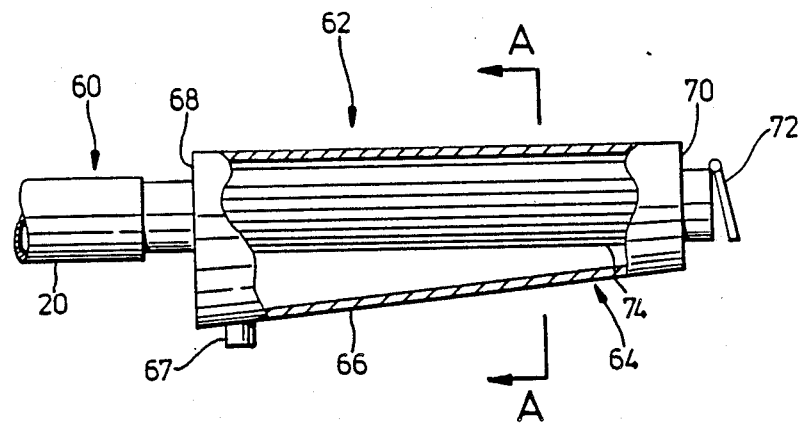
FIG. 4a is a partial sectional view of a portion of the devices illustrated in FIGS. 1, 2 and 3.
Figure 4B:
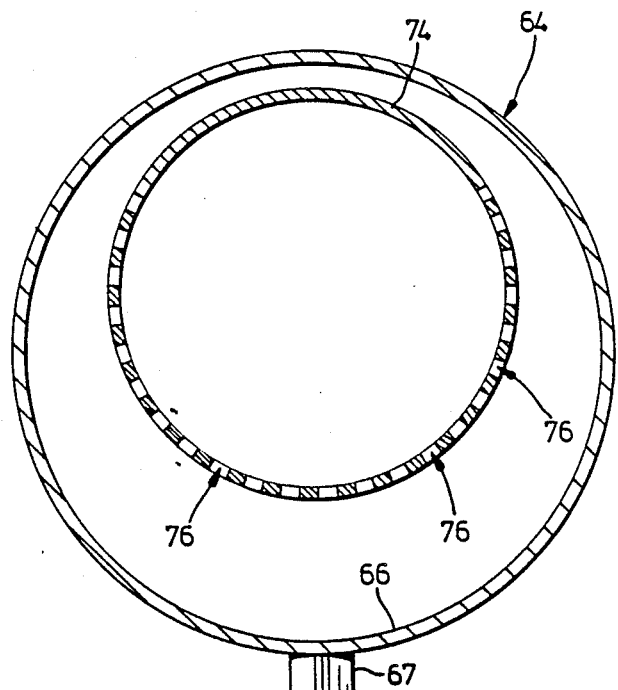
FIG. 4b is a cross section of the portion illustrated in FIG. 4a taken along line A—A.

Referring to FIGS. 4a and 4b, an embodiment of the discharge end 60 of the flexible hose 20 used in any of the above-mentioned systems 10 is shown. This embodiment includes an ice slurry drier 62 connected to the discharge end of the flexible hose 20. The drier 62 comprises a housing 64 of circular cross-section having a lower sloping bottom surface 66, the surface being provided with a drain 67. The housing includes an inlet 68 connected to the flexible hose 20 having a diameter greater than the diameter of the flexible hose 20. An outlet 70 is also provided in the housing and has a diameter larger than that of the hose but less than that of the inlet 68. A closure flap 72 is pivotally connected to the outlet 70 to seal the housing when ice-slurry is not being pumped therethrough.

A hollow cylindrical sieve 74 is provided in the housing 64 and extends between the inlet and outlet 68 and 70 thereof. The sieve 74 has a diameter substantially the same as the flexible hose 20 and directs the ice-slurry through the housing. The sieve 74 is also provided with a plurality of spaced slots 76 on a portion of its circumference that extend along the entire length of the sieve 74.

In operation, the ice-slurry produced by the ice-making machine 12 that is being discharged through the flexible hose passes from the hose 20 into the sieve 74. The longitudinally extending slots 76 do not impede the flow of the ice-slurry but allow excess brine to be drained from the ice-slurry. The excess brine passes through the slots 76 as the slurry moves along the sieve 74 and falls to the bottom of the housing 64. The sloped lower surface 66 directs the excess brine to the drain 68 so that the brine can be released from the housing. The drained ice-making slurry passes through the sieve 74 to the outlet 70 causing the flap 72 to open thereby allowing the dried ice-slurry to be applied to the catch of fish 24 or to the vessel 22. It should be noted that the drained brine can be re-circulated into the system 10 or the drain can be closed to prevent the drained brine from being released from the housing 64.

It should also be realized that the drier 61 can be used in combination with the separator 32 to increase further the drying of the ice-slurry or can be used in the systems 10 without the separator to permit the drainage of brine from the ice-slurry if desired.

We claim:

1. A cooling system comprising in combination a ship and an apparatus for cooling fish, said apparatus comprising:
    an ice-making machine disposed on said ship for processing fine ice particles in a brine solution to form an ice-brine slurry, said ice-making machine having an inlet for receiving brine and an outlet for dispensing said ice-brine slurry;
    a vessel disposed on said ship for containing seawater, said vessel having an inlet for receiving said ice-brine slurry and an outlet, the inlet of said ice-making machine being connected to the outlet of said vessel via conduit means; and
    transport means disposed on said ship and being connected to the outlet of said ice-making machine, said transport means being operable to direct said ice-brine slurry along one of at least two paths within said ship to either said vessel containing seawater or to a catch of fish.

2. The system of claim 1 including agitation means located in said vessel.

3. The system of claim 1 wherein said ice-making machine has a condenser and wherein said apparatus further includes a connection between the outlet of said vessel and the inlet of said condenser, and wherein the outlet of said condenser is connected to the inlet of said vessel.

4. A cooling system comprising in combination a ship and an appartaus for cooling fish, said apparatus comprising:
    an ice-making machine disposed on said ship for processing fine ice particles in a brine solution to form an ice-brine slurry, said ice-making machine having an outlet for dispensing said ice-brine slurry;
    a vessel disposed on said ship for containing seawater, said vessel having an inlet for receiving said ice-brine slurry; and
    transport means disposed on said ship and being connected to the outlet of said ice-making machine, said transport means including a flexible hose and a line leading to said vessel, said flexible hose and said line being connected to the outlet of said ice-machine by a three-way valve to allow said ice-brine slurry to be directed to either said vessel or to catch of fish.

5. A cooling system comprising in combination a ship and an apparatus for cooling fish, said apparatus comprising:
    an ice-making machine disposed on said ship for processing fine ice particles in a brine solution to form an ice-brine slurry, said ice-making machine having an outlet for dispensing said ice-brine slurry;
    a vessel disposed on said ship for containing seawater, said vessel having an inlet for receiving said ice-brine slurry;
    transport means disposed on said ship and being connected to a line leading from the outlet of said ice-making machine, said transport means being operable to direct said ice-brine slurry along at least two paths on said ship to either said vessel or to a catch of fish; and
    an ice and liquid separator associated with said transport means to separate ice from brine and having an ice outlet and a brine outlet, said separator having an inlet connected to said line wherein the ice outlet of said separator is connected to a flexible hose and the brine outlet of the separator is connected to the inlet of said vessel.

6. A cooling system comprising in combination a ship and an apparatus for cooling fish, said apparatus comprising:
   an ice-making machine disposed on said ship for processing fine ice particles in a brine solution to form an ice-brine slurry, said ice-making machine having an outlet for dispensing said ice-brine slurry;
   a vessel disposed on said ship for containing seawater, said vessel having an inlet for receiving said ice-brine slurry;
   transport means disposed on said ship and being connected to the outlet of said ice-making machine, said transport means including a pump having an inlet connected to the outlet of said ice-making machine and an outlet connected to a flexible hose, said flexible hose being movable within said ship between said vessel and said catch of fish, said flexible hose including an ice and liquid separator connected thereto, said ice and liquid separator including a substantially cylindrical sieve having longitudinally extending slots provided therein.

7. The system of claim 6 wherein said sieve is provided in a housing, said housing having a sloping lower wall and a drain provided in said lower wall, said sloping wall directing brine passing through said slots towards said drain.

8. The system of claim 7 wherein said housing further includes a closure flap at the outlet end thereof.

9. A method of cooling fish on board a ship comprising the steps of:
   producing a slurry of fine ice particles in a brine solution in an ice making machine located on said ship;
   directing said slurry from said ice-making machine onto either a catch of fish or into a vessel containing seawater for storing fish; and
   recirculating prechilled brine held in said vessel, to said ice-making machine.

10. The method of claim 9 wherein at least some of the brine solution is removed from said slurry prior to directing said ice particles onto said catch of fish.

11. The method of claim 10 wherein the removed brine solution is sent to said vessel.

12. The method of claim 9 wherein the contents of said vessel are agitated.

13. The method of claim 9 wherein the prechilled brine solution recirculated from said vessel is directed to a condenser in said ice-making machine and wherein warmed brine solution from said condenser is directed to said vessel.

* * * * *